May 15, 1956  F. F. VAN RADEN  2,745,661
ADJUSTABLE SADDLE ASSEMBLY FOR VEHICLE SPRINGS
Filed Feb. 13, 1953
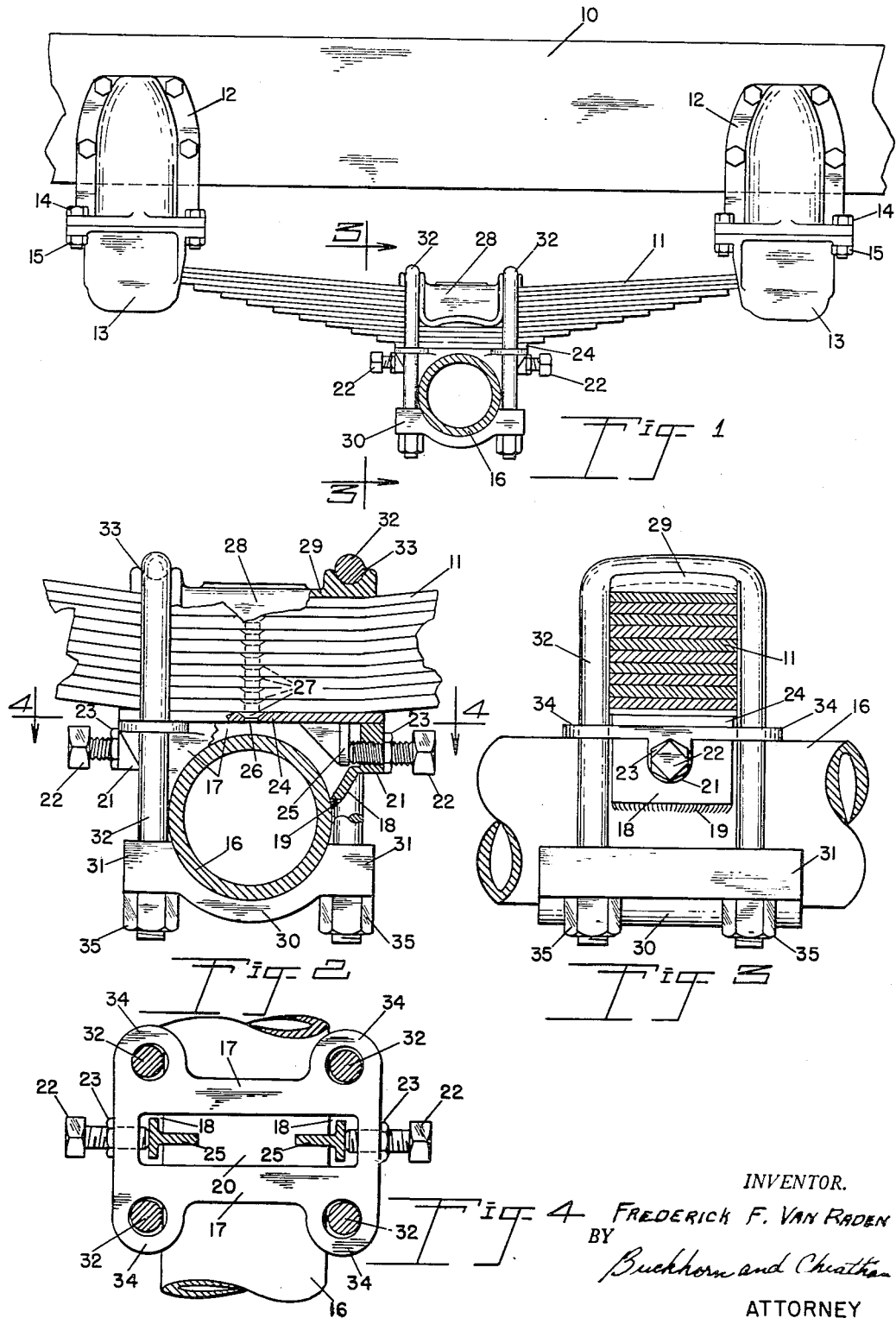

United States Patent Office 2,745,661
Patented May 15, 1956

2,745,661

ADJUSTABLE SADDLE ASSEMBLY FOR VEHICLE SPRINGS

Frederick F. Van Raden, Portland, Oreg., assignor to NePeer Company, Portland, Oreg., a copartnership Application February 13, 1953, Serial No. 336,819

1 Claim. (Cl. 267—52)

The present invention relates to adjustable saddle assembly means for vehicle springs whereby a transverse member such as an axle housing or wheel mounting trunnion may be secured to the spring in exactly transverse relation to a vehicle such as a truck or trailer. An object of the present invention is to provide means for maintaining exact wheel alignment without the use of complicated, cumbersome structures. A further object of the present invention is to provide means for permitting rapid and easy assembly of a wheel-mounting member in exact transverse relation to a vehicle.

A further object of the present invention is to provide means of the foregoing character which may be easily adjusted, and which is formed of sturdy, easily manufactured and assembled parts.

The objects and advantages of the invention will be more readily ascertained from inspection of the following specification taken in connection with the accompanying drawings wherein like numerals refer to like parts throughout, and in which a preferred embodiment of the present invention is illustrated.

In the drawings,

Fig. 1 discloses a portion of a vehicle incorporating the present invention;

Fig. 2 is an enlarged, side view of the present invention, with parts broken away;

Fig. 3 is a vertical section taken substantially along line 3—3 of Fig. 1; and

Fig. 4 is a horizontal section taken substantially along line 4—4 of Fig. 2.

In Fig. 1 there is illustrated a portion of a vehicle comprising a longitudinal frame member, such as a channel bar, indicated at 10. A longitudinally extending leaf spring 11 is mounted beneath the frame member 10 by suitable spring end shackles comprising housing parts 12 secured to the member 10, and separable housing parts 13 secured to the parts 12 by bolts 14 and nuts 15. Details of the spring securing means are not herein disclosed, since there are a number of such structures which may be used, such as, for example, the structure disclosed in the copending application of Harvey B. Van Raden, Serial No. 336,777, filed concurrently herewith, now Pat. No. 2,733,059, issued January 31, 1956. It is sufficient for the present invention to understand that there are a pair of leaf springs 11, at least one end of each leaf spring being longitudinally fixed with respect to the vehicle, and the central portions of the leaf springs being secured to a transverse member 16 such as an axle housing or a wheel-mounting trunnion.

The adjustable saddle means of the present invention comprises a base structure including side walls 17, the lower edges of which are curved to fit the upper surface of the member 16, and inwardly sloping end walls 18 which are welded to the surface of the member 16, as indicated at 19. Each of the side walls comprises a rim portion terminating in a generally horizontal plane and defining an upwardly open cavity 20 above the upper surface of the transverse member 16. Bosses 21 are provided on the upper portions of the end walls 18, the bosses being drilled and threaded for reception of a pair of adjustment screws 22 extending along a common axis transversely with respect to the member 16 and longitudinally with respect to the vehicle, the screws lying along a central axis of the base structure. The bosses terminate in outwardly facing, vertical surfaces against which may be seated lock nuts indicated at 23.

A spring seating plate 24 rests upon the rim of the base structure, the plate being substantially as wide as the leaf spring 11 and as long as the width of the base structure. The plate is provided with a pair of abutments 25 which project downwardly into the cavity 20 in spaced relation to the rim portions of the base structure whereby the abutments may be shifted both laterally and longitudinally with respect to the base structure. The abutments have outwardly facing, vertical surfaces against which the adjustment screws 22 bear, whereby longitudinal shifting of the plate 24 with respect to the base structure may be accomplished by backing off one screw and tightening the other. The abutments are laterally spaced from the rim portions to permit angular shifting of the plate relative to the axis of the member 16 as such adjustment is being accomplished. Suitable means are provided to fix the center of the plate 24 with respect to the center of the leaf spring, a form of such means comprising the provision of a countersunk hole 26 in the center of the plate, into which extends a tapered protrusion 27 on the center of the lowermost spring leaf, each of the other spring leaves having corresponding, interfitting countersinks and protrusions.

Means are provided to clamp the leaf spring onto the plate 24 and the base structure, as follows. The clamping means comprises an upper saddle member overlying and partially embracing the leaf spring, the same comprising side portions 28 which engage the side edges of the upper spring leaves and a connecting top portion 29 engaging the upper surface of the uppermost spring leaf. A lower saddle member 30 underlies and partially embraces the member 16, the member 30 having flanges 31 projecting beyond the member 16 and provided with openings for reception of vertical tie bolts 32. The tie bolts 32 preferably comprise the legs of a pair of U-bolts, the bights of which are maintained in transverse end grooves 33 at the ends of the connecting portion 29 of the upper saddle member, the U-bolts embracing the side edges of the leaves of the spring 11 to maintain them in alignment. The base structure is provided with laterally projecting ears 34, each of which is provided with an opening through which one of the tie bolts passes, the opening being of larger diameter than the diameter of the tie bolt. The bolts passing through the openings in the ears 34 maintain the entire assembly in somewhat proper relationship prior to final adjustment. Nuts 35 engage the threaded ends of the U-bolts to effect the clamping action. The U-bolts 32 preferably bear against the sides of the transverse member 16.

In utilizing the present invention the saddles are assembled to maintain the transverse member in approximately correct relation while the vehicle is under fabrication. As a final step in fabrication, the wheels mounted upon the member 16 are brought into exact alignment in the longitudinal direction by loosening the nuts 35, and shifting one or both ends of the transverse member 16 through the medium of the adjustment screws 22. When exact alignment has been achieved the adjustment screws 22 are locked by tightening the lock nuts 23 and the assembly clamped in adjusted position by tightening the nuts 35. The present invention therefore permits the manufacturer to dispense with expensive fabricating jigs, and to utilize parts having relatively large tolerances.

Having illustrated and described a preferred embodiment of the present invention, it should be apparent to those skilled in the art that the same permits of modification in arrangement and detail. I claim as my invention all such modifications as come within the true spirit and scope of the appended claim.

I claim:

Means to secure an elongated, cylindrical, wheel-supporting member in transverse relation to a vehicle comprising a leaf spring extending in the longtudinal direction of the vehicle, means securing the ends of the leaf spring to the vehicle, a base structure welded to the upper half of the surface of said member, said base structure comprising wall portions terminating in a generally horizontal plane close to the top of said member and defining an upwardly open cavity, a spring seating plate resting on said base structure and supporting the central portion of said spring on its upper surface, cooperating means on said plate and said spring to prevent relative movement thereof in the longtudinal direction of said spring, a pair of abutment means projecting into said cavity from said plate in spaced relation to said rim portions in the longitudinal direction of said spring, said abutment means extending below the top of said member in spaced relation to the surface thereof, a pair of adjustment screws mounted on said base structure and engaging said abutment means, said screws extending in opposite directions in the longitudinal direction of said spring whereby rotation thereof effects adjustment of said member relative to said spring in the longitudinal direction of the vehicle, and means to clamp said member, said plate and said spring together in the vertical sense, comprising an upper saddle overlying and partially embracing a central portion of said leaf spring, a lower saddle overlying and partially embracing a portion of said member, and vertical tie bolt means adjustably securing said saddles to each other comprising a pair of U-bolts each straddling said leaf spring.

References Cited in the file of this patent
UNITED STATES PATENTS

| | | |
|---|---|---|
| 881,933 | Kramer | Mar. 17, 1908 |
| 1,316,017 | Clemens | Sept. 16, 1919 |
| 2,559,103 | Anderson | July 3, 1951 |
| 2,587,522 | Pilkington | Feb. 26, 1952 |